US012681343B2

(12) United States Patent
Zhou

(10) Patent No.: US 12,681,343 B2
(45) Date of Patent: Jul. 14, 2026

(54) BEAM REGULATION STRUCTURE AND APPARATUS, AND ELECTRONIC DEVICE

(71) Applicants: Beijing BOE Technology Development Co., Ltd., Beijing (CN); BOE Technology Group Co., Ltd., Beijing (CN)

(72) Inventor: Jian Zhou, Beijing (CN)

(73) Assignees: Beijing BOE Technology Development Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 57 days.

(21) Appl. No.: 18/766,715

(22) Filed: Jul. 9, 2024

(65) Prior Publication Data

US 2024/0361627 A1 Oct. 31, 2024

Related U.S. Application Data

(63) Continuation of application No. PCT/CN2023/090457, filed on Apr. 25, 2023.

(51) Int. Cl.
| | |
|---|---|
| *G02F 1/13* | (2006.01) |
| *G02F 1/1337* | (2006.01) |
| *G02F 1/1343* | (2006.01) |

(52) U.S. Cl.
CPC ...... *G02F 1/1326* (2013.01); *G02F 1/133769* (2021.01); *G02F 1/134309* (2013.01)

(58) Field of Classification Search
CPC .. G02F 1/1326; G02F 1/1347; G02F 1/13471; G02F 1/13476
See application file for complete search history.

(56) References Cited

U.S. PATENT DOCUMENTS

| | | | |
|---|---|---|---|
| 10,481,433 B1 * | 11/2019 | Reshetnyak | ........ G02F 1/13362 |
| 11,487,184 B1 * | 11/2022 | Akselrod | ................ G02F 1/292 |
| 2019/0222195 A1 * | 7/2019 | Matsuda | ............ H03H 9/02637 |
| 2022/0299605 A1 * | 9/2022 | Soskind | ................. G02F 1/216 |
| 2024/0012307 A1 * | 1/2024 | Brar | ........................ G02F 1/011 |

* cited by examiner

*Primary Examiner* — Jessica M Merlin
(74) *Attorney, Agent, or Firm* — IPro, PLLC

(57) ABSTRACT

Provided is a beam regulation structure, including: a waveguide layer and a grating layer. The grating layer includes a plurality of functional structures, connection portions disposed between the plurality of functional structures, and a plurality of regulation units. Slit openings running through the functional structures along a thickness direction of the functional structure is formed in the functional structures. One of the regulation units is disposed on a side, away from the waveguide layer, of one of the functional structures. Each of the regulation units includes a first regulation component and a second regulation component successively disposed along a direction away from the functional structures. The first regulation component is configured to transmit or scatter an electromagnetic wave fed from the waveguide layer through the slit opening. The second regulation component is configured to tune a phase of the electromagnetic wave transmitted by the first regulation component.

16 Claims, 6 Drawing Sheets

201

2

BEAM REGULATION STRUCTURE AND APPARATUS, AND ELECTRONIC DEVICE

CROSS-REFERENCE TO RELATED APPLICATION

This application is a continuation application of international application No. PCT/CN2023/090457, filed on Apr. 25, 2023, the content of which is herein incorporated by reference in its entirety.

TECHNICAL FIELD

The present disclosure relates to the field of optical waveguide integration technology, and in particular, relates to a beam regulation structure and apparatus, and an electronic device.

BACKGROUND

The principle of holography is that an interference surface is formed by the interference of a target wave with a reference wave, and then the target wave is acquired by inversion of the reference wave irradiating the interference surface.

SUMMARY

The present invention provides a beam regulation structure and apparatus, and an electronic device.

According to some embodiments of the present disclosure, a beam regulation structure is provided. The beam regulation structure includes a waveguide layer and a grating layer disposed on the waveguide layer. The grating layer includes a plurality of functional structures and connection portions disposed between the plurality of functional structures, wherein slit openings running through the functional structures along a thickness direction of the functional structure are formed in the functional structures; and the beam regulation structure further includes a plurality of regulation units, wherein one of the regulation units is disposed on a side, away from the waveguide layer, of one of the functional structures, and each of the regulation units includes a first regulation component and a second regulation component that are successively disposed along a direction away from the functional structures; wherein the first regulation component is configured to transmit or scatter an electromagnetic wave fed from the waveguide layer through the slit opening; and the second regulation component is configured to tune a phase of the electromagnetic wave transmitted by the first regulation component.

The first regulation component includes a first electrode and a second electrode disposed opposite to each other, and a first tunable dielectric layer disposed between the first electrode and the second electrode, wherein the first tunable dielectric layer is configured to transmit or scatter, based on a voltage applied between the first electrode and the second electrode.

The first tunable dielectric layer includes a polymer network stabilized liquid crystal.

The functional structure serves as the first electrode of the first regulation component disposed thereon.

The second regulation component includes a third electrode and a fourth electrode disposed opposite to each other, and a second tunable dielectric layer disposed between the third electrode and the fourth electrode, wherein the second tunable dielectric layer is configured to regulate, based on a voltage applied between the third electrode and the fourth electrode, a phase of the electromagnetic wave transmitted by the first regulation component.

The second electrode of the first regulation component is multiplexed as the third electrode of the second regulation component disposed thereon.

The first electrode is electrically connected to a first driver by a first bias voltage line, the second electrode is electrically connected to a second driver by a second bias voltage line, and the fourth electrode is electrically connected to a third driver by a third bias voltage line.

A material of the second tunable dielectric includes liquid crystal molecules.

The functional structure and the connection portion are formed as an integral structure.

A material of the grating layer is any one of silver, aluminum, copper, or gold.

The waveguide layer is a silicon-based waveguide.

According to some embodiments of the present disclosure, a beam regulation apparatus is provided. The beam regulation apparatus includes: a plurality of beam regulation structures as described above.

Functional structures in each of the beam regulation structures are juxtaposed along a first direction, and the plurality of the beam regulation structures are juxtaposed along a second direction.

The beam regulation apparatus includes switching transistors arranged in one-to-one correspondence with regulation units; wherein a second electrode of each of the switching transistors is electrically connected to a first regulation component, gate electrodes of the switching transistors juxtaposed along the first direction are electrically connected to a same scan line, and first electrodes of the switching transistors juxtaposed along the second direction are connected to a same data line.

According to some embodiments of the present disclosure, an electronic device is provided. The electronic device includes the beam regulation structure as described above.

DETAILED DESCRIPTION

Figure 1:
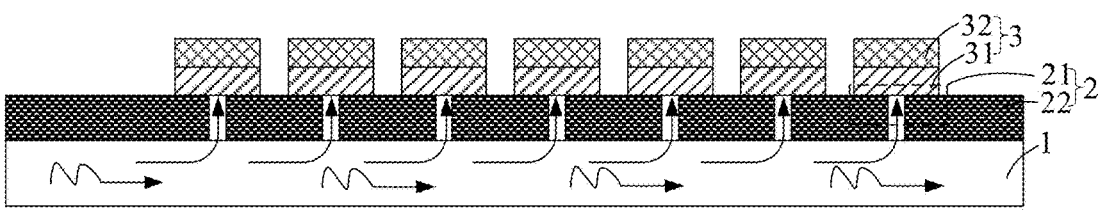
FIG. 1 is a schematic diagram of a beam regulation structure according to some embodiments of the present disclosure.

The present disclosure is described in further detail with reference to the accompanying drawings, to clearly present the objects, technical solutions, and advantages of the present disclosure.

The terms used in the detailed description of the present disclosure are merely for interpreting, instead of limiting, the embodiments of the present disclosure. It should be noted that unless otherwise defined, technical or scientific terms used in the embodiments of the present disclosure shall have ordinary meanings understandable by persons of ordinary skill in the art to which the disclosure belongs. The terms "first," "second," and the like used in the embodiments of the present disclosure are not intended to indicate any order, quantity, or importance, but are merely used to distinguish the different components. The terms "comprise," "include," and derivatives or variations thereof are used to indicate that the element or object preceding the terms covers the element or object following the terms and its equivalents, and shall not be understood as excluding other elements or objects. The terms "connect," "contact," and the like are not intended to be limited to physical or mechanical connections, but may include electrical connections, either direct or indirect connection. The terms "on," "under," "left," and "right" are only used to indicate the relative positional relationship. When the absolute position of the described object changes, the relative positional relationship may change accordingly.

Due to the emergence of metamaterials, it is possible to realize holographic antenna in the microwave band. The holographic antenna system only includes a holographic surface and a feed source, and the structure of the system is very simple. The feed source generally adopts a horn antenna, monopole antenna, or slit antenna, which does not need a complex feed network. However, to reduce the profile, the monopole antenna or slit antenna often serves as the feed source. The holographic surface is mainly composed of a dielectric substrate and a periodically distributed metal patch array, which is simple to process and low cost. In the process of designing the holographic surface, it is only necessary to calculate an expression of an interference field formed by the interference between a target field and a reference field and design the distribution of the metal patch by referring to the expression of the interference field, such that the holographic surface required is acquired. The design process is very simple. If different target waves are acquired, it is only necessary to re-substitute the target field expression into the above process. This design simplicity and flexibility is another major advantage of the holographic antenna. In addition, the holographic antenna is also easy to conformal, and its performance is not greatly affected when it is attached to spherical, cylindrical, or other curved surfaces.

Waveguide-fed hypersurface antennas and apertures have gained sufficient importance in various fields, such as computational imaging, communications, radar and synthetic aperture radar imaging, and wireless energy transmission.

Energy is fed by an array of metamaterial units distributed on a surface using a guided wave (each unit size is much smaller than an operating wavelength). Each sub-wavelength metamaterial unit is capable of scattering an incident field that is primarily equivalent to a polarized electric or magnetic dipole, while introducing phase shifts and energy attenuation into an excitation field. The phase shift and the amount of attenuation injected into the incident wave by scattering are related to the structure of the metamaterial unit. The phase and amplitude variations are not independent but are correlated, and the relationship is related to the intrinsic characteristics of the Lorentz resonance. the hypersurface antenna is excited by tilted incident plane waves or by conducting wave feeds. For the lack of independent control of phase and amplitude, the phase focusing of the incident wave is used for compensation, which is similar to the operation mechanism of the leaky wave and transmitted wave antenna. In a case where a spacing between metamaterial elements is deep sub-wavelength, the incident wave is transmitted by a simple on/off unit and sampled by blocking energy. Such extreme, sub-wavelength sampling can be achieved by high-fidelity beams and other radiation patterns combined with numerical optimization techniques.

Before describing the embodiments of the present disclosure, it should be noted that the description of the embodiments of the present disclosure is given only using a scenario where the functional structure is a superstructure unit as an example.

Figure 2:
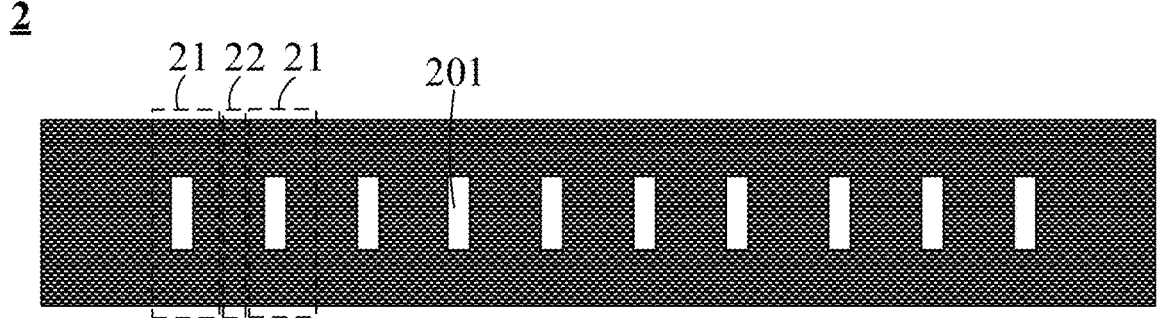
FIG. 2 is a partially enlarged diagram of a beam regulation structure according to some embodiments of the present disclosure.
Figure 3:
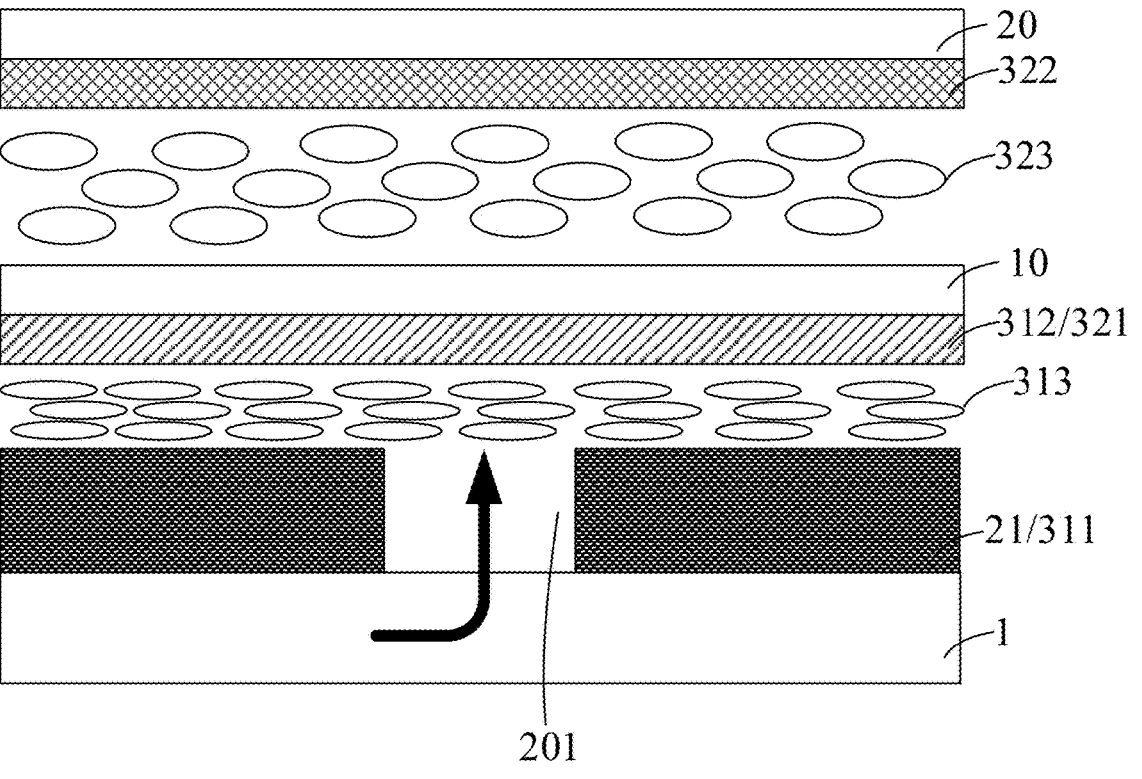
FIG. 3 is a top view of a grating layer of a beam regulation structure according to some embodiments of the present disclosure.

In a first aspect, FIG. 1 is a schematic diagram of a beam regulation structure according to some embodiments of the present disclosure, FIG. 2 is a partially enlarged diagram of a beam regulation structure according to some embodiments of the present disclosure, and FIG. 3 is a top view of a grating layer of a beam regulation structure according to some embodiments of the present disclosure. As illustrated in FIG. 1-32, the embodiments of the present disclosure provide a beam regulation structure, including a waveguide layer 1, a grating layer 2, and a plurality of regulation units 3. The grating layer 2 is disposed on the waveguide layer 1 and includes a plurality of superstructure units 21 and connection portions 22 disposed between the superstructure units 21. The superstructure unit 21 has a slit opening 201 running through the superstructure unit 21 in a thickness direction thereof. A regulation unit 3 is disposed on a side, away from the waveguide layer 1, of one of the superstructure units 21. In the embodiments of the present disclosure, the superstructure units 21 are in one-to-one correspondence with the regulation units 3. Each regulation unit 3 in the embodiments of the present disclosure includes a first regulation component 31 and a second regulation component 32 that are successively disposed along a direction away from the superstructure unit 21. The first regulation component 31 is configured to transmit or scatter an electromagnetic wave fed by the waveguide layer 1 through the slit opening 201. That is, the first regulation component 31 has at least two operating states, which are a transmitting state and a scattering state. The transmitting state indicates that the first regulation component 31 transmits the electromagnetic wave toward a direction in which the second regulation component 32 is disposed, and the scattering state indicates that the first regulation component 31 scatters the electromagnetic wave toward a direction in which the waveguide layer 1 is disposed. The second regulation component 32 is configured to tune a phase of the electromagnetic wave transmitted by the first regulation component 31.

The beam regulation structure in the embodiments of the present disclosure achieves the effect of dynamically switching between the transmitting state and the scattering state of the unit by providing the first regulation component 31 on the superstructure unit 21 and regulating the electromagnetic wave that is transmitted through the slit opening of the superstructure unit 21, such that the dynamic regulation of the beam of the electromagnetic wave is achieved. In addition, the second regulation component 32 is configured to control the phase of the transmitted electromagnetic wave, such that the phase regulation is achieved and the amplitude is not affected. The phase compensates the beam, which further enhances the beam pointing, and the phase also serves as a random phase generation to reduce the side lobe. In this way, the radiation performance is generally improved.

Figure 4:
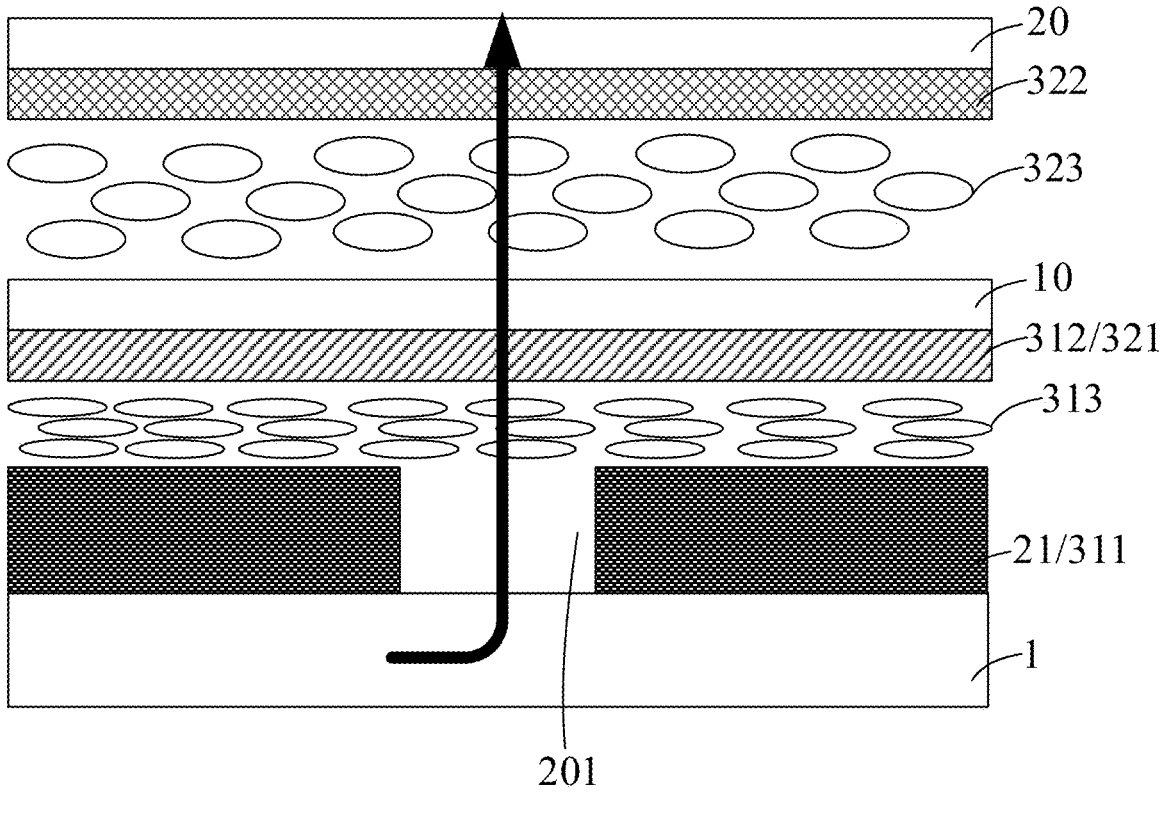
FIG. 4 is a schematic diagram of a transmitted electromagnetic wave of a beam regulation structure according to some embodiments of the present disclosure.
Figure 5:
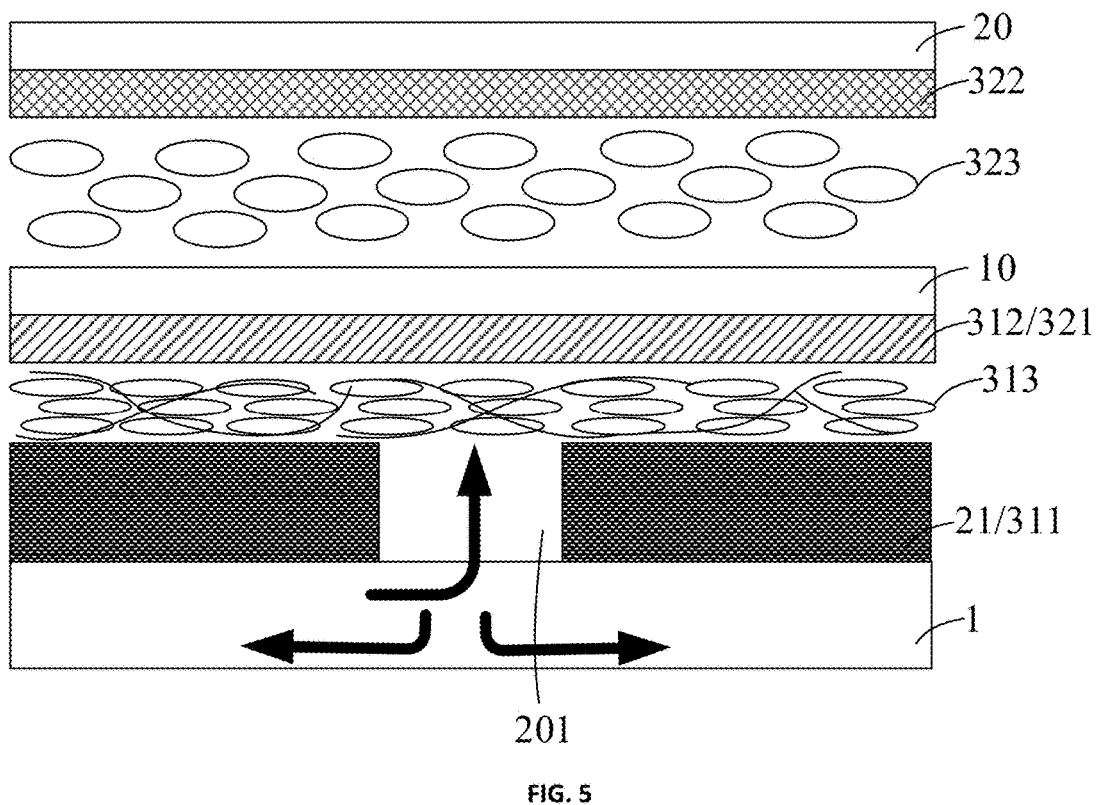
FIG. 5 is a schematic diagram of a scattered electromagnetic wave of a beam regulation structure according to some embodiments of the present disclosure.

FIG. 4 is a schematic diagram of a transmitted electromagnetic wave of a beam regulation structure according to some embodiments of the present disclosure. FIG. 5 is a schematic diagram of a scattered electromagnetic wave of a beam regulation structure according to some embodiments of the present disclosure. In some embodiments, as shown in FIG. 4 and FIG. 5, the first regulation component 31 includes a first electrode 311 and a second electrode 312 that are oppositely disposed, and a first tunable dielectric layer 313 disposed between the first electrode 311 and the second electrode 312. The first tunable dielectric layer 313 is configured to achieve transmission or scattering of the electromagnetic wave fed by the slit opening 201 based on a voltage applied between the first electrode 311 and the second electrode 312. For example, the first tunable dielectric layer 313 is a polymer network stabilized liquid crystal PSLC. Because the polymer network stabilized liquid crystal molecule has both a scattering state and a transparent state, the deflection of the polymer network stabilized liquid crystal molecule is altered by applying a voltage to the first electrode 311 layer and the second electrode 312 layer. The polymer network stabilized liquid crystal molecule contains a domain region composed of polymers, a refractive index of the domain region and a state refractive index of an anisotropic liquid crystal molecule are basically the same, and the refractive index of the domain region differs most from an equivalent refractive index of a liquid crystal molecule perpendicular to the first state. In this case, the polymer domain will divide the liquid crystal molecule into more than micrometer intervals. Due to the existence of more than micrometer intervals, the scattering characteristic towards the electromagnetic wave sharply enhanced from a completely transparent state into a strong scattering state. By using this characteristic, the electromagnetic wave transmitting through the slit is regulated, such that the effect of dynamic switching of the unit state is achieved, and the dynamic regulation of the beam of the electromagnetic wave is achieved.

It should be noted that the first electrode 311 of the first regulation component 31 is closer to the waveguide layer 1 than the second electrode 312. The second electrode 312 is formed on a first dielectric substrate and a waveguide layer 1 opposite box having the first electrode 311 is then formed. Both the first electrode 311 and the second electrode 312 are plate electrodes or electrode layers with conductive patterns, which are not limited herein as long as the first electrode 311 and the second electrode 31 are capable of generating an electric field to regulate the state of the first tunable dielectric layer 313.

In some embodiments, each superstructure unit 21 is multiplexed as the first electrode 311 of the first regulation component 31 disposed thereon. In this case, one electrode is omitted, and thus the beam regulation structure is simple and it is easy to achieve a lightweight structure. Further, in the embodiments of the present disclosure, the description is given using a scenario where each superstructure unit 21 is multiplexed as the first electrode 311 of the first regulation component 31 disposed thereon as an example.

In some embodiments, referring to FIG. 2, the second regulation component 32 includes a third electrode 321 and a fourth electrode 322 that are disposed opposite to each other, and a second tunable dielectric layer 323 disposed between the third electrode 321 and the fourth electrode 322. The second tunable dielectric layer 323 is configured to tune, based on a voltage applied between the third electrode 321 and the fourth electrode 322, a phase of the electromagnetic wave transmitted by the first regulation component 31. For example, the second tunable dielectric layer 323 is a liquid crystal layer. In this case, by applying voltages to the third electrode 321 and the fourth electrode 322, the deflection of the liquid crystal molecule is changed, such that the phase of the electromagnetic wave transmitted through the first regulation component 31 is changed. At this point, the compensation is performed by the phase of the first regulation component 31 and the beam, or all of the phase through the superstructure unit 21 is defined randomly, such that the high-performance radiated far-field pattern is acquired.

Further, for each regulation unit 3, the third electrode 321 in the second regulation component 32 is multiplexed with the second electrode 312 in the first regulation component 31 disposed thereon, such that one electrode is omitted, and thus the beam regulation structure is simple and it is easy to achieve a lightweight structure. In the embodiments of the present disclosure, the description is given using a scenario where the third electrode 321 in the second regulation component 32 is multiplexed with the second electrode 312 in the first regulation component 31 disposed thereon as an example.

It should be noted that the fourth electrode 322 is provided on a second dielectric substrate, and a first dielectric substrate opposite box having the second electrode 312 or third electrode 321 is then formed. The third electrode 321 and the fourth electrode 322 are plate electrodes or electrode layers having conductive patterns, which are not limited herein, as long as the third electrode 321 and the fourth electrode 322 are capable of generating an electric field upon loading voltages to change a dielectric constant of the second tunable dielectric layer.

In some embodiments, the superstructure unit 21 and the connection portion 22 are formed integrally. That is, a conductive film layer is formed on the waveguide layer 1, after which the grating layer is formed by opening the slit opening 201. In some embodiments of the present disclosure, the grating layer is made of a metal, which is any one of silver Ag, aluminum Al, copper Cu, and gold Au. The grating layer in the embodiments of the present disclosure is not limited to these materials, which may be specifically defined according to the specific situation.

In some embodiments, the second electrode and the fourth electrode are made of indium tin oxide ITO, or any other transparent conductive material.

Figure 6:
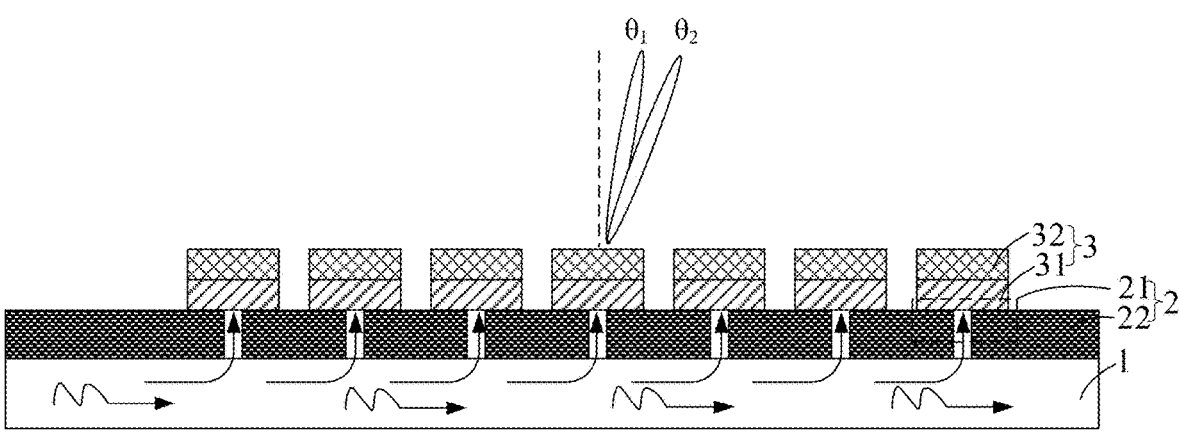
FIG. 6 is a resultant graph of a forward incident electromagnetic wave of a beam regulation structure according to some embodiments of the present disclosure, wherein the beam pointing is reconfigurable.
Figure 7:
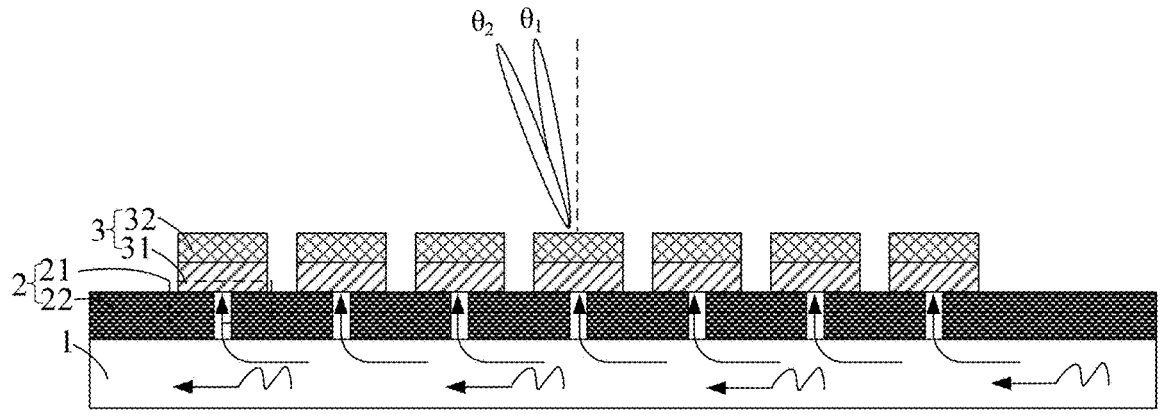
FIG. 7 is a resultant graph of a reverse incident electromagnetic wave of a beam regulation structure according to some embodiments of the present disclosure, wherein the beam pointing is reconfigurable.

FIG. 6 is a resultant graph of a forward incident electromagnetic wave of a beam regulation structure according to some embodiments of the present disclosure, wherein the beam pointing is reconfigurable. FIG. 7 is a resultant graph of a reverse incident electromagnetic wave of a beam regulation structure according to some embodiments of the present disclosure, wherein the beam pointing is reconfigurable. In some embodiments, as shown in FIG. 6 and FIG. 7, with respect to holographic regulation, for the forward incident electromagnetic waves, the negative electromagnetic scanning effect cannot be achieved by a regulation method using the grating period directly, and thus the negative electromagnetic scanning effect is achieved by changing a feed direction of the electromagnetic wave or by rotating the device by 180°. The dynamic change of the pointing of the electromagnetic wave coupled from the waveguide layer 1 to free space is achieved by selecting to open or close different numbers of superstructure units 21 successively.

Figure 8:
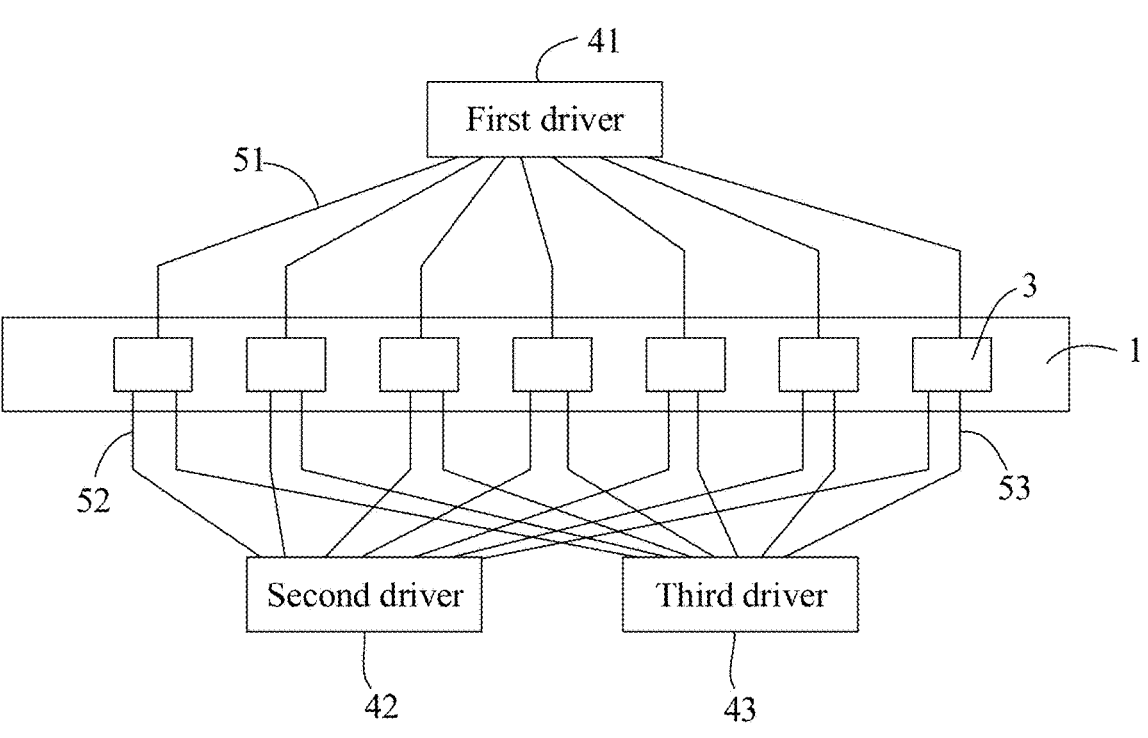
FIG. 8 is a schematic connecting line diagram of a beam regulation structure according to some embodiments of the present disclosure.

FIG. 8 is a schematic connecting line diagram of a beam regulation structure according to some embodiments of the present disclosure. In some embodiments, the first electrode 311 in the first regulation component 31 is electrically connected to a first driver 41 by a first bias voltage line 51, the second electrode 312 is electrically connected to a second driver 42 by a second bias voltage line 52, and the fourth electrode 322 in the second regulation component 32 is electrically connected to a third driver 42 by a third bias voltage line 53. In this case, a corresponding drive voltage is provided to each type of bias voltage line by a plurality of drivers, respectively, such that the scanning control of the beam pointing of the electromagnetic wave feeding out of free space is achieved.

For a clearer understanding of the beam regulation structure of the embodiments of the present disclosure, the description is given using the following scenario as an example. The superstructure unit 21 and the connection portion 22 in the grating layer 2 of the beam regulation structure are integrally formed; the first regulation component 31 includes the first electrode 311 and the second electrode 312 that are disposed opposite to each other, and the first tunable dielectric layer 313 disposed between the first electrode 311 and the second electrode 312, where each of the superstructure units 21 is multiplexed as the first electrode 311 of the first regulation component 31 disposed thereon, and the first tunable dielectric layer 313 is made of a polymer network stabilized liquid crystal; and the second regulation component 32 includes the third electrode 321 and the fourth electrode 322 that are disposed opposite to each other, and the second tunable dielectric layer 323 disposed between the third electrode 321 and the fourth electrode 322, where the third electrode 321 in the second regulation component 32 is multiplexed with the second electrode 312 in the first regulation component 31 disposed thereon, and the second tunable dielectric layer 323 is a liquid crystal layer.

Different beam pointing is designed using the holographic principle, and the principle is analyzed as follows.

$$\Psi_{ref}(\vec{r}) = \exp\left(-ik_g \cdot \vec{r}\right)$$

The target and reference wave functions are respectively described above. Acquiring the interference pattern of the array by using the holographic principle is as follows.

$$\Psi_{-e_f} = \Psi_{adj}\Psi_{rff}^*$$

$$\Psi_{-e_f}(\vec{r}; \theta_0, \varphi_0) = \exp\left(-ik_f(\theta_0, \varphi_0) \cdot \vec{r}\right)\exp\left(ik_z \cdot \vec{r}\right)$$

For the one-dimensional periodic superstructure unit 21, based on the above-interfered functions, the wave vector is acquired as:

$$k_m = k_z - k_0 \sin\theta$$

The periodic sub-wavelength grating layer 2 is designed as a one-dimensional interference array:

$$k_m = \frac{2\pi}{\Lambda}(\pm m)$$

By designing the sub-wavelength grating layer 2, $\Lambda$ is utilized to combine different numbers of sub-wavelength superstructure units 21, such that the period is reconfigurable. By designing the forward beam pointing to be reconfigurable, and designing m=1, the above equations are combined as follows:

$$k_z - k_0 \sin\theta = \frac{2\pi}{\Lambda}$$

Thus, dynamic scanning of the beam direction is performed by switching on and off different sub-wavelength superstructure unit structures:

$$\sin\theta = \frac{k_z - \dfrac{2\pi}{\Lambda}}{k_0}$$

Based on the sub-wavelength beam regulation principle described above, as shown in FIG. 1 to FIG. 4, the electromagnetic wave is fed through the waveguide layer, and each superstructure unit 21 only allows the electromagnetic wave to be coupled to the superstructure unit 21 above it from the gap between the metals. The polymer network stabilized liquid crystal in the first regulation component 31 regulates the electromagnetic wave to transmit upwardly or to scatter downwardly. By applying voltages to the first electrode 311 and the second electrode 312, the refractive index difference between the domain region of the polymer network stabilized liquid crystal molecule and the surrounding polymer network stabilized liquid crystal molecule is changed, the refractive index difference is acquired to achieve the strong scattering of the electromagnetic wave. For the electromagnetic wave running through the first regulation component 31, by applying voltages to the third electrode 321 and the fourth electrode 322, the deflection of the liquid crystal molecule is changed, and thus the phase of the electromagnetic wave running through the first regulation component 31 is changed. At this point, the high-performance radiation far-field pattern is acquired by the phase compensation or all of the random phase settings transmitted through the superunits. Combine the following equation.

$$\sin\theta = \frac{k_z - \dfrac{2\pi}{\Lambda}}{k_0}$$

In a case where the period of the superstructure unit 21 becomes smaller, $$\frac{2\pi}{\Lambda}$$

gradually becomes larger, and therefore, the scanning angle is smaller. In a case where the period of the superstructure unit 21 becomes larger, $$\frac{2\pi}{\Lambda}$$

gradually becomes smaller, and therefore, the scanning angle gradually becomes larger, such that the scanning of the electromagnetic wave is achieved by a simple change of period.

In the embodiments of the present disclosure, the first tunable dielectric layer 313 in the first regulation component 31 is the polymer network stabilized liquid crystal PSLC. Because the polymer network stabilized liquid crystal molecule has two types of states, which are scattering and transparent states, the deflection of the polymer network stabilized liquid crystal molecule is changed by applying a voltage to the first electrode 311 layer and the second electrode 312 layer. The polymer network stabilized liquid crystal molecule contains a domain region composed of polymer, a refractive index of the domain region is basically the same as a state refractive index of the anisotropic liquid crystal molecule, and the refractive index of the domain region differs most from an equivalent refractive index of the liquid crystal molecule perpendicular to the first state. Under this circumstance, the polymer domain region divides the liquid crystal molecule into more than micrometer intervals. Due to the existence of more than micrometer intervals, the scattering characteristic for the electromagnetic wave is dramatically enhanced from the completely transparent state to the strong scattering state. By using this characteristic, the electromagnetic wave running through the gap is regulated, such that the effect of dynamic switching of the unit state is achieved, and thus the dynamic regulation of the beam of the electromagnetic wave is achieved. The second tunable dielectric layer 323 of the second regulation component 32 is a liquid crystal layer. In this case, by applying a voltage to the third electrode 321 and the fourth electrode 322, the deflection of the liquid crystal molecule is changed, such that the phase change of the electromagnetic wave transmitted through the first regulation component 31 is achieved. At this point, the high-performance radiation far-field pattern is acquired by phase compensation or all of the random phase settings transmitted through the super-units.

In a second aspect, some embodiments of the present disclosure provide a beam regulation apparatus. The apparatus includes a plurality of beam regulation structures as described above.

Figure 9:
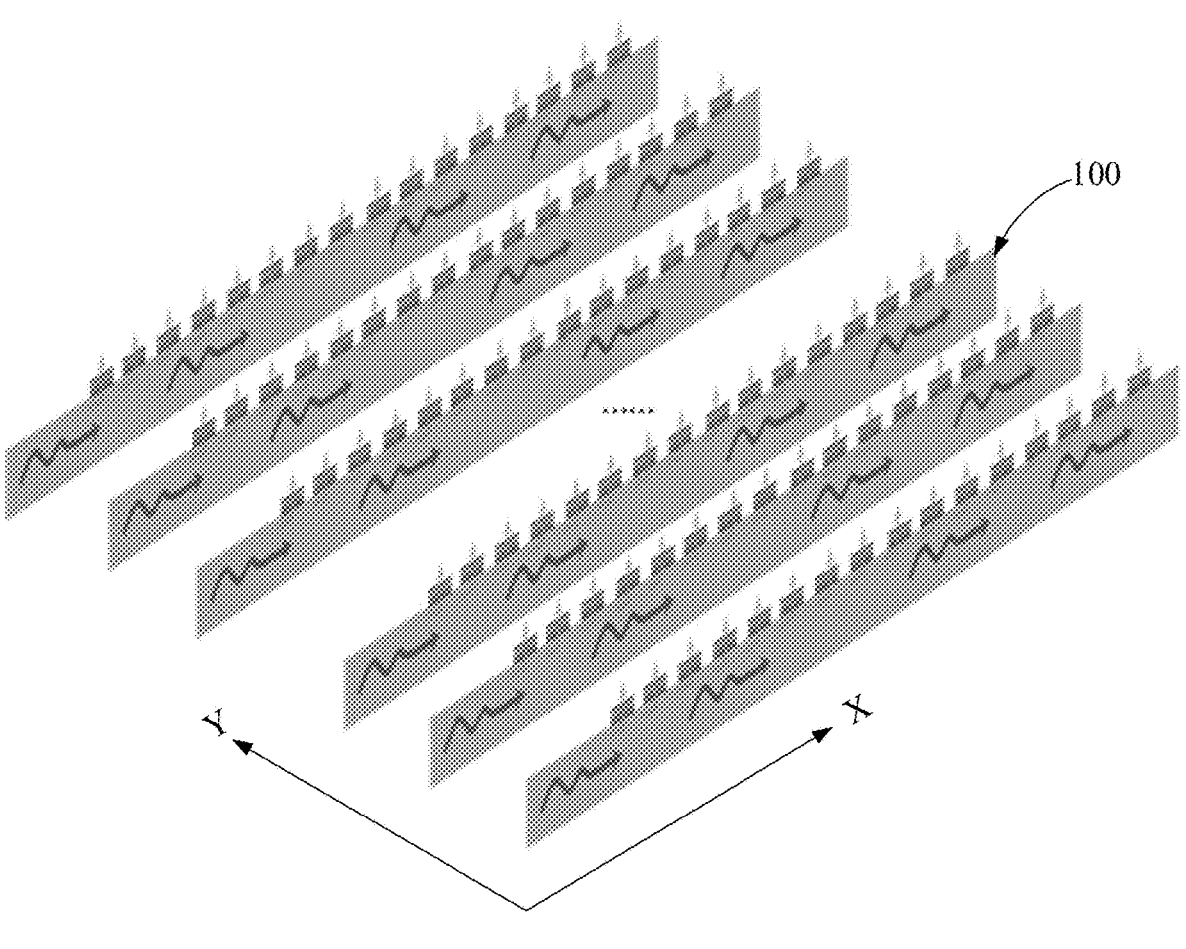
FIG. 9 is a schematic diagram of a beam regulation apparatus according to some embodiments of the present disclosure.

FIG. 9 is a schematic diagram of a beam regulation apparatus according to some embodiments of the present disclosure. In some embodiments, as shown in FIG. 9, superstructure units 21 in each of the beam regulation structures 100 are juxtaposed along a first direction X, and the plurality of beam regulation structures 100 are juxtaposed along a second direction Y. In this case, individual waveguide layers 1 are fed by a power division network. In such embodiments, by controlling a plurality of one-dimensional periodic arrays, a sub-wavelength grating layer 2 of a two-dimensional periodic structure is constructed, such that the beam regulation over the entire space is achieved.

Figure 10:
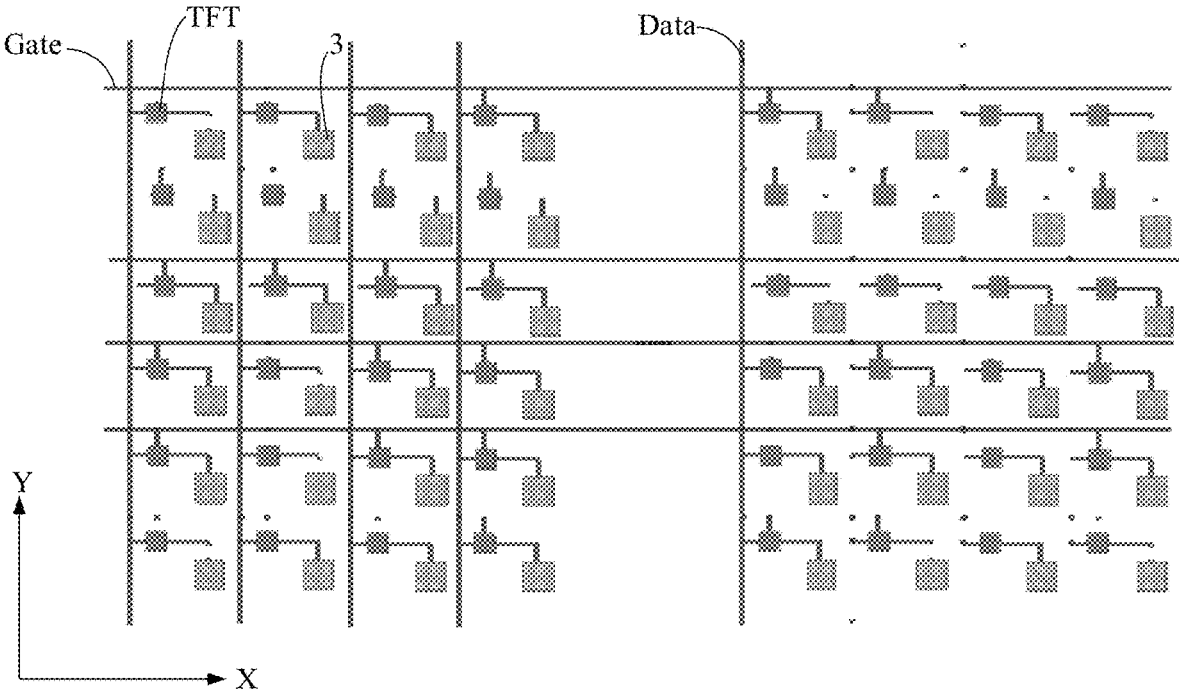
FIG. 10 is another schematic diagram of a beam regulation apparatus according to some embodiments of the present disclosure.

FIG. 10 is another schematic diagram of a beam regulation apparatus according to some embodiments of the present disclosure. In some examples, as shown in FIG. 10, the beam regulation apparatus further includes switching transistors TFT in one-to-one correspondence with the regulation units 3. A second electrode of each of the switching transistors TFT is electrically connected to a first regulation component 31, specifically electrically connected to a first electrode 311 in the first regulation component 31. That is, the second electrode of each of the switching transistors TFT is electrically connected to the superstructure unit 21. Gate electrodes of the switching transistors TFT juxtaposed along the first direction X are electrically connected to the same scan line Gate, and first electrodes of the switching transistors TFT juxtaposed along the second direction Y are connected to the same data line Data. In this case, by arranging the switching transistors TFT, the two-dimensional periodical array is more convenient to control, and thus the beam regulation over the entire space is achieved.

In a third aspect, some embodiments of the present disclosure provide an electronic device. The electronic device includes the beam regulation structure described above or the beam regulation apparatus described above.

It should be understood that the above embodiments are merely exemplary embodiments to illustrate the principles of the present invention. However, the present invention is not limited thereto. For those skilled in the art, various variations and improvements may be made without departing from the spirit and substance of the present invention, which shall be also regarded as the scope of protection of the present invention.

The invention claimed is:

1. A beam regulation structure, comprising: a waveguide layer and a grating layer disposed on the waveguide layer;

wherein the grating layer comprises a plurality of functional structures and connection portions disposed between the plurality of functional structures, slit openings running through the functional structures along a thickness direction of the functional structure being formed in the functional structures; and the beam regulation structure further comprises a plurality of regulation units, wherein one of the regulation units is disposed on a side, away from the waveguide layer, of one of the functional structures, and each of the regulation units comprises a first regulation component and a second regulation component that are successively disposed along a direction away from the functional structures; wherein the first regulation component is configured to transmit or scatter an electromagnetic wave fed from the waveguide layer through the slit opening; and the second regulation component is configured to tune a phase of the electromagnetic wave transmitted by the first regulation component, wherein the first regulation component comprises a first electrode and a second electrode disposed opposite to each other, and a first tunable dielectric layer disposed between the first electrode and the second electrode, wherein the first tunable dielectric layer is configured to transmit or scatter, based on a voltage applied between the first electrode and the second electrode, the functional structure serves as the first electrode of the first regulation component disposed thereon.

2. The beam regulation structure according to claim 1, wherein the first tunable dielectric layer comprises a polymer network stabilized liquid crystal.

3. The beam regulation structure according to claim 1, wherein the second regulation component comprises a third electrode and a fourth electrode disposed opposite to each other, and a second tunable dielectric layer disposed between the third electrode and the fourth electrode, wherein the second tunable dielectric layer is configured to regulate, based on a voltages applied between the third electrode and the fourth electrode, a phase of the electromagnetic wave transmitted by the first regulation component.

4. The beam regulation structure according to claim 3, wherein the second electrode of the first regulation component is multiplexed as the third electrode of the second regulation component disposed thereon.

5. The beam regulation structure according to claim 4, wherein the first electrode is electrically connected to a first driver by a first bias voltage line, the second electrode is electrically connected to a second driver by a second bias voltage line, and the fourth electrode is electrically connected to a third driver by a third bias voltage line.

6. The beam regulation structure according to claim 3, wherein a material of the second tunable dielectric comprises liquid crystal molecules.

7. The beam regulation structure according to claim 1, wherein the functional structure and the connection portion are formed as an integral structure.

8. The beam regulation structure according to claim 1, wherein a material of the grating layer is any one of silver, aluminum, copper, or gold.

9. The beam regulation structure according to claim 1, wherein the waveguide layer is a silicon-based waveguide.

10. A beam regulation apparatus, comprising: a plurality of beam regulation structures, wherein each of the beam regulation structures comprises: a waveguide layer and a grating layer disposed on the waveguide layer;

wherein the grating layer comprises a plurality of functional structures and connection portions disposed between the plurality of functional structures, slit openings running through the functional structures along a thickness direction of the functional structure being formed in the functional structures; and the beam regulation structure further comprises a plurality of regulation units, wherein one of the regulation units is disposed on a side, away from the waveguide layer, of one of the functional structures, and each of the regulation units comprises a first regulation component and a second regulation component that are successively disposed along a direction away from the functional structures; wherein the first regulation component is configured to transmit or scatter an electromagnetic wave fed from the waveguide layer through the slit opening; and the second regulation component is configured to tune a phase of the electromagnetic wave transmitted by the first regulation component, wherein the first regulation component comprises a first electrode and a second electrode disposed opposite to each other, and a first tunable dielectric layer disposed between the first electrode and the second electrode, wherein the first tunable dielectric layer is configured to transmit or scatter, based on a voltage applied between the first electrode and the second electrode, the functional structure serves as the first electrode of the first regulation component disposed thereon.

11. The beam regulation apparatus according to claim 10, wherein the functional structures in each of the beam regulation structures are juxtaposed along a first direction, and the plurality of beam regulation structures are juxtaposed along a second direction.

12. The beam regulation apparatus according to claim 11, comprising:

switching transistors arranged in one-to-one correspondence with regulation units;

wherein a second electrode of each of the switching transistors is electrically connected to the first regulation component, gate electrodes of the switching transistors juxtaposed along the first direction are electrically connected to a same scan line, and first electrodes of the switching transistors juxtaposed along the second direction are connected to a same data line.

13. The beam regulation apparatus according to claim 10, wherein the first tunable dielectric layer comprises a polymer network stabilized liquid crystal.

14. The beam regulation apparatus according to claim 10, wherein the second regulation component comprises a third electrode and a fourth electrode disposed opposite to each other, and a second tunable dielectric layer disposed between the third electrode and the fourth electrode, wherein the second tunable dielectric layer is configured to regulate, based on a voltages applied between the third electrode and the fourth electrode, a phase of the electromagnetic wave transmitted by the first regulation component.

15. An electronic device, comprising: the beam regulation apparatus as defined in claim 10.

16. An electronic device, comprising: a beam regulation structure, wherein the beam regulation structure comprises: a waveguide layer and a grating layer disposed on the waveguide layer;

wherein the grating layer comprises a plurality of functional structures and connection portions disposed between the plurality of functional structures, slit openings running through the functional structures along a thickness direction of the functional structure being formed in the functional structures; and the beam regulation structure further comprises a plurality of regulation units, wherein one of the regulation units is disposed on a side, away from the waveguide layer, of one of the functional structures, and each of the regulation units comprises a first regulation component and a second regulation component that are successively disposed along a direction away from the functional structures; wherein the first regulation component is configured to transmit or scatter an electromagnetic wave fed from the waveguide layer through the slit opening; and the second regulation component is configured to tune a phase of the electromagnetic wave transmitted by the first regulation component, wherein the first regulation component comprises a first electrode and a second electrode disposed opposite to each other, and a first tunable dielectric layer disposed between the first electrode and the second electrode, wherein the first tunable dielectric layer is configured to transmit or scatter, based on a voltage applied between the first electrode and the second electrode, the functional structure serves as the first electrode of the first regulation component disposed thereon.

* * * * *